United States Patent [19]

Beck et al.

[11] Patent Number: 5,362,695
[45] Date of Patent: Nov. 8, 1994

[54] INORGANIC MOLECULAR SIEVES ENCAPSULATING CHELATES

[75] Inventors: Jeffrey S. Beck, Princeton; Ralph M. Dessau, Edison; John B. Higgins, Titusville, all of N.J.

[73] Assignee: Mobil Oil Corp., Fairfax, Va.

[21] Appl. No.: 45,383

[22] Filed: Apr. 13, 1993

[51] Int. Cl.$^5$ .................... B01J 29/04; C01B 33/34
[52] U.S. Cl. .................... 502/62; 423/702; 423/706
[58] Field of Search ............ 423/702, 706, 328.3; 502/62

[56] References Cited

U.S. PATENT DOCUMENTS

| | | | |
|---|---|---|---|
| 2,882,243 | 4/1959 | Milton | 252/455 |
| 2,982,612 | 5/1961 | Barrer et al. | 23/113 |
| 3,355,246 | 11/1967 | Kuehl | 23/113 |
| 3,791,964 | 2/1974 | Kuehl | 208/120 |
| 3,966,766 | 6/1976 | Lehn | 260/327 R |
| 4,440,871 | 4/1984 | Lok et al. | 502/214 |
| 4,861,570 | 8/1989 | Kuehl et al. | 423/706 |
| 5,167,942 | 12/1992 | Balkus et al. | 423/705 |

OTHER PUBLICATIONS

R. Szostak, Handbook of Molecular Sieves, Van Nostrand Reinhold New York 1992, pp. 577–584.
Balkus, et al. "Zeolite Encapsulated Gadolinium (III) Chelate Complexes", Ninth International Zeolite Conference, Montreal, Canada, Jul. 5–10, 1992.
Estermann, et al., "A Synthetic Gallophosphate Molecular Sieve With A 20-Tetrahedral-Atom Pore Opening", Nature 352: 320–323 (1991).
Kuhl and Schmitt, "A Reexamination of Phosphorus–Containing Zeolites ZK–21 and ZK–22 In Light of SAPO-42", Zeolites 10: 2–7 (1990).
Lot, et al., "The Role of Organic Molecules in Molecular Sieve Synthesis", Zeolite 3: 282–291 (1983).
Kryptofix brochure, MCB Reagents, Cincinnati, Ohio 45212.

*Primary Examiner*—Carl F. Dees
*Attorney, Agent, or Firm*—Alexander J. McKillop; Malcolm D. Keen; Dennis P. Santini

[57] ABSTRACT

A crystalline molecular sieve is synthesized as encapsulating chelating agents which are macrocyclic organic molecules containing from about 8 to about 18 members in cyclic configuration with at least one bicyclic bridge having from about 3 to about 10 members, the molecule members being carbon, nitrogen, oxygen, sulfur, selenium, phosphorus and/or arsenic. The molecules contain at least two nitrogen members and at least one member is oxygen, sulfur, selenium, phosphorus, and/or arsenic, and the members include sufficient bonds to contiguous members or to hydrogen to form stable molecules. The macrocycles may be complexed with metal ions and the molecular sieve may be used in catalysis and medical imaging.

10 Claims, No Drawings

INORGANIC MOLECULAR SIEVES ENCAPSULATING CHELATES

BACKGROUND OF THE INVENTION

1. Field of the Invention

This invention relates to crystalline molecular sieves which encapsulate macrocyclic organic molecules that can complex metals, method for preparation of the molecular sieves and uses thereof.

2. Description of the Prior Art

Zeolite materials, both natural and synthetic, have been demonstrated in the past to have catalytic properties for various types of hydrocarbon conversion. Certain zeolitic materials are ordered, porous, crystalline aluminosilicates having a definite crystalline structure as determined by X-ray diffraction, within which there are a large number of smaller cavities and channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Zeolites typically have uniform pore diameters of about 3 Angstroms to about 10 Angstroms. The chemical composition of zeolites can vary widely and they typically consist of $SiO_2$ in which some of the silicon atoms may be replaced by tetravalent ions such as Ti or Ge, by trivalent ions such as Al, B, Ga, Fe, or by bivalent ions such as Be, or by a combination of any of the aforementioned ions. When there is substitution by bivalent or trivalent ions, cations such as Na, K, Ca, $NH_4$ or H are also present.

Representative samples of siliceous zeolites are small pore zeolites such as NaA, CaA, Erionite; medium pore zeolites such as ZSM-5, ZSM-11, ZSM-22, ZSM-23, ZSM-48, ZSM-12, zeolite beta; and large pore zeolites such as zeolite L, ZSM-4 (omega), NaX, NaY, CaY, REY, US-Y, ZSM-20, and mordenite.

Zeolites include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of the cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by Zeolite A (U.S. Pat. No. 2,882,243), Zeolite X (U.S. Pat. No. 2,882,244), Zeolite Y (U.S. Pat. No. 3,130,007), Zeolite Beta (U.S. Pat. No. 3,308,069), ZK-5 (U.S. Pat. No. 3,247,195), ZK-4 (U.S. Pat. No. 3,314,752), ZSM-5 (U.S. Pat. No. 3,702,886), ZSM-5/ZSM11 intermediate (U.S. Pat. No. 4,229,424), ZSM-23 (U.S. Pat. No. 4,076,842), ZSM-11 (U.S. Pat. No. 3,709,979), ZSM-12 (U.S. Pat. No. 3,832,449), ZSM-20 (U.S. Pat. No. 3,972,983), ZSM-35 (U.S. Pat. No. 4,016,245), ZSM-38 (U.S. Pat. No. 4,046,859), and ZSM-48 (U.S. Pat. No. 4,375,573), merely to name a few. All of the above patents are incorporated herein by reference.

The silicon/aluminum atomic ratio of a given zeolite is often variable. For example, Zeolite X can be synthesized with silicon/aluminum atomic ratios of from 1 to 1.5; zeolite Y, from 1.5 to about 3. In some zeolites, the upper limit of the silicon/aluminum atomic ratio is unbounded. ZSM-5 is one such example wherein the silicon/aluminum atomic ratio is at least 12. U.S. Pat. No. 3,941,871 (U.S. Pat. No. Re. 29,948) discloses a porous crystalline silicate made from a reaction mixture containing no deliberately added aluminum in the recipe and exhibiting the X-ray diffraction pattern characteristic of ZSM-5 type zeolites. U.S. Pat. Nos. 4,061,724, 4,073,865 and 4,104,294 describe crystalline silicas of varying aluminum and metal content. These zeolites can consist essentially of silica, containing only traces or no detectable amounts of aluminum.

Another class of molecular sieves consists of $AlO_2$-$PO_2$ units ($AlPO_4$) whose Al or P constituents optionally may be substituted by other elements such as Si (called silicoaluminophosphates or SAPO's), or metals (called metaloaluminophosphates or MeAPO's) or combinations thereof (called metaloaluminophosphosilicates or MeAPSO's). As with aluminosilicates, the ALPO$_4$'s, SAPO's, MeAPO's and MeAPSO's are crystalline and have ordered pore structures which accept certain molecules while rejecting others and they are often considered to be zeolitic materials.

Aluminum phosphates are taught, for example, in U.S. Pat. Nos. 4,310,440 and 4,385,994. These aluminum phosphate materials have essentially electroneutral lattices. U.S. Pat. No. 3,801,704 teaches an aluminum phosphate treated in a certain way to impart acidity. Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

Compositions comprising crystals having a framework topology after heating at 110° C. or higher giving an X-ray diffraction pattern indicating pore windows formed by 18 tetrahedral members of about 12–13 Angstroms in diameter are taught in U.S. Pat. No. 4,880,611.

A method for synthesizing crystalline metaloaluminophosphates (MeAPO's) is shown in U.S. Pat. No. 4,713,227, and an antimonophosphoaluminate and the method for its synthesis are taught in U.S. Pat. No. 4,619,818. U.S. Pat. No. 4,567,029 teaches metaloaluminophosphates, and titaniumaluminophosphate and the method for its synthesis are taught in U.S. Pat. No. 4,500,651.

All of the above patents are incorporated herein by reference.

The precise crystalline microstructure of crystalline molecular sieves manifests itself in a well-defined X-ray diffraction pattern that usually contains many sharp maxima and that serves to uniquely define the material. Similarly, the dimensions of the pore and the internal cage structures are very regular, due to the precise repetition of the crystalline microstructure.

Prior techniques for synthesizing crystalline molecular sieves have involved the preparation of solutions containing oxide sources and organic molecules. It has been theorized that the organic molecules may act as templating agents around which the molecular sieve crystallizes. However, in general, there is no clear correlation between specific organics and crystalline structure of the molecular sieve. Therefore, although a resulting crystalline structure which has been synthesized in the presence of an organic molecule may be observed and its X-ray diffraction pattern determined, it is often not clear what exact role the organics play in the synthesis.

Metals have been introduced into molecular sieves by ion exchange, impregnation, codeposition, adsorption from a gaseous phase, introduction of metal compounds during crystallization or absorption of metal vapor to introduce a metal component into pore cavities or onto the surfaces.

There has been no suggestion to introduce metal into a molecular sieve as part of a bicyclic organic complex or ligand which is highly stable and can retain its integrity during and after crystallization.

Accordingly, it is an object of the invention to provide microporous, tetrahedral framework crystalline molecular sieves containing immobilized ion specific bicyclic chelating agents.

SUMMARY OF THE INVENTION

The invention is a crystalline molecular sieve encapsulating chelating agents which are macrocyclic organic molecules containing from about 8 to about 18 members in cyclic configuration with a bicyclic bridge having from about 3 to about 10 members. The molecule members are selected from a group consisting of carbon, nitrogen, oxygen, sulfur, selenium, phosphorus, and arsenic, and the molecules contain at least two nitrogen members and at least one member selected from a group consisting of oxygen, sulfur, selenium, phosphorus and arsenic. Each member includes sufficient bonds to adjacent members or to hydrogen to form stable molecules.

The invention is also a method for synthesizing molecular sieves encapsulating these ion specific, macrocyclic, bicyclic organic molecules by crystallizing the molecular sieves in the presence of the organic macrocycle.

The molecular sieves can be used in catalysis and as a paramagnetic source in medical imaging.

DETAILED DESCRIPTION OF THE INVENTION

The macrocyclic organic molecules are ion specific chelating agents which can be immobilized by encapsulation within a crystalline molecular sieve by crystallization of the molecular sieve in the presence of the chelating agent which acts as an organic template. The chelating agents introduced into the synthesis mixture may also be in the form of metal complexes.

Molecular sieves which may be synthesized in this manner include any crystalline molecular sieve which has an internal cavity, i.e., a cage, with dimensions large enough to encapsulate the organic macrocycle. Suitable molecular sieves include silicates, aluminosilicates, silicoaluminophosphates, aluminophosphates and gallophosphates. A molecular sieve may have small pores while having cages large enough to encapsulate the macrocycles. Therefore, the ability of a molecular sieve to encapsulate the macrocycles is not dependent on pore size.

In the crystallization of zeolites including silicates and aluminosilicates, generally a reaction mixture is prepared containing an oxide of silicon, optionally an aluminum source, a templating agent which is an organic nitrogen containing compound, and an alkaline aqueous medium. The crystallizations are carried out under hydrothermal conditions at a temperature from about 50° C. to about 300° C., at a pressure from about 15 psig to about 1000 psig, for a time of about 0.5 hour to about two weeks.

Although zeolites include materials containing silicon and aluminum, it is recognized that the silicon and aluminum atoms may be replaced in whole or in part with other elements. For example, Ge is an art recognized substitute for Si, and B, Cr, Fe and Ga are art recognized replacements for Al. Accordingly, the term zeolite as used herein shall connote not only materials containing silicon and, optionally, aluminum atoms in the crystalline lattice structure thereof, but also materials which contain suitable replacement atoms for such silicon and/or aluminum.

In the synthesis of silicoaluminophosphate-like materials, generally a reaction mixture is prepared comprising sources of X oxide, Y oxide and Z oxide, wherein X represents one or more elements of +3 valence selected from the group consisting of, for example, aluminum, iron, chromium, vanadium, molybdenum, arsenic, antimony, manganese, gallium and boron; Y represents one or more elements of +4 valence selected from the group consisting of, for example, silicon, germanium and titanium, Z represents one or more elements of +5 valence selected from the group consisting of, for example, phosphorus, arsenic, antimony and vanadium; an organic directing agent, inorganic ions, and water. The synthesis is carried out under hydrothermal conditions generally at temperatures from about 50° C. to about 300° C., at a pressure from about 15 psig to about 1000 psig, for a time of about 0.5 hour to about two weeks.

In the synthesis of aluminophosphate-like materials, generally a reaction mixture is prepared containing sources of X oxide and Z oxide, the oxides as described above. These oxides are, for example, aluminum oxide and phosphorus oxide. The reaction mixture also contains organic directing agent and water. The synthesis is carried out under hydrothermal conditions, generally at temperatures from about 50° C. to about 300° C., at a pressure from about 15 psig to about 1000 psig, for a time of about 0.5 hour to about two weeks.

In the synthesis of gallophosphates, generally a reaction mixture is prepared containing sources of gallium oxide, phosphorus oxide, fluoride ions, organic directing agent and water. The synthesis is carried out under hydrothermal conditions, generally at temperatures from about 100° C. to about 200°, at a pressure from about 15 psig to about 1000 psig, for a time of about 1 hour to about two weeks.

In the crystallization of molecular sieves, the sources of +1 or +2 valence metals, e.g. alkali metal, may be, for example, sodium, lithium, calcium, magnesium, cesium or potassium which may be supplied as hydroxides, halides (e.g. chlorides, and bromides), sulfates, nitrates, acetates, silicates, aluminates, phosphates and salts of carboxylic acids.

A +3 valence oxide such as that of aluminum may be supplied from known oxides or hydroxides, organic or inorganic salt or compound, e.g. alumina. The aluminum oxide may be provided as only an impurity in another reactant, e.g., the silica source.

A +4 valence oxide such as that of silicon can be supplied from known sources such as silicates, silica hydrosol, precipitated silica hydrosol, precipitated silica, alkoxy or other compounds of such element, e.g. Hi-Sil, silica gel, silica acid.

The +5 valence oxide, e.g. that of phosphorus can be supplied from any form of phosphorus acids or phosphorus oxides, phosphates, phosphites and organic derivatives of such element.

In the past, sources of nitrogen-containing cations have included, for example, primary, secondary or tertiary amines or quaternary ammonium compounds including, for example, tetramethylammonium, tetrapropylammonium; amino alcohols, for example, triethanolammonium; oxygen-containing organics such as crown ethers and ethylene glycol; and other nitrogen containing organics such as choline, pyridine, piperidine, pyrrolidine, cobalticinium and quinuclidine.

In the present invention, the templating agents include macrocyclic, bicyclic chelating agents which can bind metals more tightly than square planar, two dimensional macrocycles.

The preferred macrocycles are three dimensional heterocyclic organic structures including from about 8 to about 18 members, preferably 15 members, with bicyclic bridges of 3 to 10 members, preferably 5-8 members. The members are selected from the group consisting of carbon, oxygen, nitrogen, sulfur, selenium, phosphorus and arsenic and preferably include two nitrogens and at least one oxygen. Each member includes sufficient bonds to adjacent atoms or to hydrogen to form stable molecules.

The three dimensional structure of the macrocycle provides an internal open cavity for cation complexation. Hence a cage within a cage effect is created when an inorganic microporous framework is crystallized around the macrocycle.

A preferred macrocycle is water soluble and has an 18 member outer ring, e.g., 4,7,13,16,21,24-hexaoxa-1,10-diazabicyclo(8,8,8)-hexacosane.

The templating agents include a class of organic compounds which are termed cryptands and spherands. Compounds of this type are described, for example, in U.S. Pat. No. 3,966,766 to J. M. Lehn which is herein incorporated by reference.

Cryptands are bicyclic and cyclic three dimensional higher order molecules generally composed of ethyleneoxy (—OCH2CH2O—) chain attached to a nitrogen atom at either end. Spherands are similar molecules such as these whose cavities can be occupied by spherical entities. Cryptands and spherands are commercially available as Kryptofix from MCB Reagents, Cincinnati, Ohio.

Non-limiting representative examples include 4,7,13,18-tetraoxa-1,10-diazabicyclo (8,5,5)eicosane which has the structure:

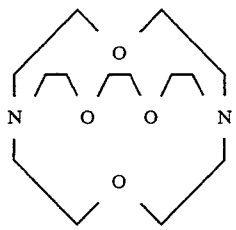

and 4,7,13,16,21,24-hexaoxa-1,10-diazabicyclo(8,8,8)-hexacosane which has the structure:

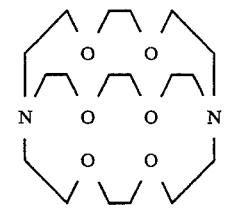

The macrocycles form complexes with metals, with the nitrogen, oxygen, sulfur, phosphorus, arsenic or selenium atoms acting as electron donor atoms to an electron acceptor metal ion. Coordination numbers of metal ions of donor atoms to which the metal ions can coordinate, are generally 2, 4, 6 or 8. A macrocycle with enough donor atoms in the proper configuration can bind more than one metal ion. The chelate compound can be neutral or a positive or negative ion complex so that it may also include counterions outside the macrocycle.

Ions to be complexed include Cs, Fr, Be, Mg, Ca, Sr, Ba, Ra, B, Al, Ga, In, Tl, Li, Na, K, Rb, Si, Ge, Sn and Pb and transition metal ions. For the purpose of this specification, transition metals are to be understood as including metals having partly filled d or f shells in any of their commonly occurring oxidation states. Accordingly, transition metals include the first transition series, which consists of Sc, Ti, V, Cr, Mn, Fe, Co, Ni and Cu, as well as the second transition series, which consists of Y, Zr, Nb, Mo, Tc, Ru, Ph, Pd, and Ag. The transition metals in accordance with the above definition includes the lanthanide series, which consists of La, Ce, Pr, Nd, Pm, Sm, Eu, Gd, Tb, Dy, Ho, Er, Tm, Yb and Lu, the third transition series which consists of Hf, Ta, W, Re, Os, Ir, Pt, and Au, and the actinide series, which consists of Ac, Th, Pa, U, Np, Pu, Am, Cm, Bk, Cf, Es, Fm, Md, No, and Lr. The most useful transition metal ions are those of the first transition series, the second transition series, the lanthanide series and the third transition series. These metal ions may be summarized according to the Periodic Table of the Elements, (CRC Handbook of Chemistry and Physics, 69th Ed., CRC Press, Inc., Boca Raton, Fla. 1988), CAS version as Groups IA, IIA, IIIA, IVA, and transition metals IIIB, IVB, VB, VIB, VIIB, VIII, and IB, including lanthanides and actinides.

A three dimensional macrocyclic metal complex used to transport metal ions to highly dispersed specific locations in the molecular sieve is more stable than two dimensional ligands and allows more precision than with previously used methods of ion exchanging metal cations into the molecular sieve from solution with no control over the location of metal in the molecular sieve.

Molecular sieves which can be synthesized according to the invention include as non-limiting examples, Zeolite A described in U.S. Pat. No. 2,882,243; NaA described in U.S. Pat. No. 2,982,612; ZK-21 described in U.S. Pat. No. 3,355,246; ZK-22 described in U.S. Pat. No. 3,791,964; SAPO-42 described in U.S. Pat. No. 4,440,871; NaQ described by Barrer et al., *J. Chem. Soc.* 1959, 195 (1959); and Cloverite described by M. Estermann et al., *Nature* 352, 320 (1991), which is a gallophosphate containing 20-ring pore openings shaped like four leaf clovers and a 29-30 Angstrom supercage. The structural building blocks of the Cloverite framework are distorted $Ga_4P_4O_{12}$ cubes, i.e., Linde Type A framework, each containing an encapsulated fluoride ion.

After synthesis, the molecular sieves may be utilized as-synthesized for medical imaging or may be calcined or solvent treated to decompose the organic molecule, leaving behind the metal. For example, the molecular sieves may be calcined in an oxygen-containing atmosphere, preferably air, at a rate of 0.2° to 5° C./minute to a temperature greater than 300° C. but below a temperature at which the crystallinity of the zeolite is adversely affected. Generally, such temperature will be below 600° C. Preferably the temperature of calcination is between the approximate range of 350° to 550° C. for a time of 1 to 24 hours.

The molecular sieves may also be incorporated with binder or matrix material as is known in the art. The molecular sieves may also be incorporated with additional hydrogenation components by methods known in the art.

The molecular sieves encapsulating metal complexes of organic macrocycles are advantageously used in catalytic processes and in medical imaging.

The composition prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as be extrusion, the crystals can be extruded before drying or partially dried and then extruded.

It may be desired to incorporate the new composition with another material, i.e. a matrix, resistant to the temperatures and other conditions employed in various organic conversion processes. Such materials include active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Catalyst compositions containing the present composition will generally comprise from about 1% to 90% by weight of the present composition and from about 10% to 99% by weight of the matrix material. More preferably, such catalyst compositions will comprise from about 2% to 80% by weight of the present composition and from about 20% to 98% by weight of the matrix.

Use of a material in conjunction with the new composition, i.e. combined therewith, which is active, tends to alter the conversion and/or selectivity of the overall catalyst in certain organic conversion processes. Inactive materials suitable serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It may be desirable to provide a catalyst having good crush strength because in commercial use it is desirable to prevent the catalyst from breaking down into powder-like materials. These clay binders have been employed normally only for the purpose of improving the crush strength of the overall catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the present composition can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative-proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite.

A catalytically active form of the present composition as a catalyst component, may be used in reforming stocks which can be reformed employing a temperature of from about 370° C. to about 540° C., a pressure of from about 100 psig to about 1000 psig (791 to 6996 kPa), preferably from about 200 psig to about 700 psig (1480 to 4928 kPa), a liquid hourly space velocity is from about 0.1 to about 10, preferably from about 0.5 to about 4, and a hydrogen to hydrocarbon mole ratio of from about 1 to about 20, preferably from about 4 to about 12.

A catalyst comprising the present composition can also be used for hydroisomerization of normal paraffins, when provided with a hydrogenation component, e.g. platinum. Such hydroisomerization is carried out at a temperature of from about 90° to about 375° C., preferably from about 145° C. to about 290° C., with a liquid hourly space velocity of from about 0.01 to about 2, preferably from about 0.25 to about 0.50, and with a hydrogen to hydrocarbon mole ratio of from about 1:1 to about 5:1. Additionally, such a catalyst can be used for olefin or aromatic isomerization, employing a temperature of from about 200° C. to about 480° C.

Such a catalyst can also be used for reducing the pour point of gas oils. This reaction is carried out at a liquid hourly space velocity of from about 10 to about 30 and at a temperature of from about 425° C. to about 595° C.

Other reactions which can be accomplished employing a catalyst comprising the composition of this invention containing a metal, e.g. platinum, include hydrogenation-dehydrogenation reactions and desulfurization reactions, olefin polymerization (oligomerization) and other organic compound conversions, such as the conversion of alcohols (e.g. methanol) or ethers (e.g. dimethylether) to hydrocarbons, and the alkylation or aromatics (e.g. benzene) in the presence of an alkylating agent (e.g. ethylene).

Alpha Value may also be determined. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. 3,354,078, in *The Journal of Catalysis*, 6, pp. 522–529 (August 1965), and in *The Journal of Catalysis*, 61, p. 395 (1980), each incorporated herein by reference as to that description. Preferred experimental conditions include a constant temperature of 538° C. and variable flow rate as described in detail in *The Journal of Catalysis*, 61, p. 395.

When ion exchange capacity is examined, it is determined by titrating with a solution of sulfamic acid the gaseous ammonia evolved during the temperature programmed decomposition of the ammonium-form of the present composition. The method is described in *Thermochimica Acta*, Vol. III, pp. 113–124, 1971 by G. T. Kerr and A. W. Chester, incorporated herein by reference as to that description.

The composition of the invention also advantageously used as a paramagnetic source in medical imaging, i.e., magnetic resonance imaging (MRI), particularly when the macrocycle is complexed with a lanthanide. In MRI, use is made of nuclear magnetic resonance of protons to produce proton density maps or images of the human body. The process is based on the precessional properties of tiny magnetic moments of atomic nuclei. Hydrogen nuclei (protons) in tissue absorb stimulating electromagnetic radiation and subsequent emissions by such nuclei can be detected and used to form high contrast images which show good contrast on soft tissue, especially tumors, edemas and infarcts.

The apparatus for NMR includes an electromagnet or superconducting magnet to provide a magnetic field. The molecular sieve encapsulating macrocycles can have paramagnetic properties for this use.

In the following example X-ray diffraction data were collected with conventional X-ray systems, using copper K-alpha radiation. The positions of the peaks, expressed in degrees 2 theta, where theta is the Bragg angle, were determined by scanning 2 theta. The interplanar spacings, d, measured in Angstrom units (Å), and the relative intensities of the lines, $I/I_o$, where $I_o$ is one-hundredth the intensity of the strongest line, including subtraction of the background, were derived from the experimental X-ray diffraction pattern. Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated, such as by dilute acid treatment. Other variations can occur, depending on the +4 valence element/+3 valence element, e.g. phosphorus/aluminum, ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation.

The invention is illustrated by the following nonlimiting examples.

EXAMPLE

To a solution of 3.59 gm of gallium sulfate ($Ga_2(SO_4)_3$) dissolved in 40 gm of distilled water with heating at 90°–110° C. was added a solution containing 0.7 gm of 49% aqueous HF dissolved in 10 gm of distilled water. At this point, aqueous phosphoric acid (1.93 gm of $H_3PO_4$ dissolved in ca. 10 gm of water) was added to the above solution, followed after several minutes by the addition of 5.0 gm of 4,7,13, 18,21,24-hexaoxa-1 10-diazabicyclo (8,8,8) hexacosane dissolved in 30 gm of water. After several minutes, an additional 4.0 gm of the hexacosane was added in solid form. The addition of the hexacosane ultimately caused the precipitation of white solids which appeared dispersed in the aqueous phase. The final pH of the reactant gel was about 3.5. The gel was divided into two portions A and B and transferred to stainless steel, 45 mL Parr reactors. The A portion was heated to 150° C. for 5 days and the B portion was heated to 190° C. for one day. The resulting products were filtered and washed with distilled water and acetone.

The product was characterized by XRD, SEM and NMR analysis.

The product of A had the following X-ray diffraction pattern:

| Interplanar d-spacing (Å) | Relative Intensity |
|---|---|
| 12.01(.3) | s |
| 8.48(.2) | m-w |
| 6.92(.2) | m |
| 5.99(.2) | m-w |
| 5.36(.2) | w |
| 4.24(.2) | w |
| 4.05(.2) | w |
| 4.00(.2) | m |
| 3.79(.2) | w |
| 3.61(.2) | w |
| 3.32(.2) | w |
| 3.20(.2) | w |
| 3.12(.2) | w |
| 2.91(.1) | m-s |
| 2.82(.1) | w |
| 2.77(.1) | w |
| 2.68(.1) | w |
| 2.63(.1) | w |
| 2.61(.1) | w |

0 = ±
d = distance between the reflecting layers (planes)

Intensity scale is: vw=0–20, w=20–40, m=40–60, s=60–80 and vs=80–100.

The as-synthesized X-ray diffraction patterns of product A and product B corresponded to this x-ray diffraction pattern.

SEM analysis revealed large crystals (10–100 microns) displaying a cubic habit.

Solid-state C-NMR showed that the template was incorporated intact in the molecular sieve framework.

What is claimed is:

1. A composition comprising a crystalline molecular sieve encapsulating a macrocyclic organic molecule containing from about 8 to about 18 members in cyclic configuration with at least one bicyclic bridge having from about 3 to about 10 members, the molecule having members selected from a group consisting of carbon, nitrogen, oxygen, sulfur, selenium, phosphorus and arsenic, the members including at least two nitrogen atoms and at least one atom selected from a group consisting of oxygen, sulfur, selenium, phosphorus and arsenic, and the members including sufficient bonds to contiguous members or to hydrogen to form stable molecules.

2. The composition of claim 1 wherein the molecular sieve is selected from a group consisting of silicates, aluminosilicates, aluminophosphates, gallophosphates and silicoaluminophosphates.

3. The composition of claim 1 wherein the molecular sieve is gallophosphate.

4. The composition of claim 1 wherein the molecular sieve has the LTA framework topology.

5. The composition of claim 1 wherein the macrocyclic organic molecule is complexed with at least one ion selected from a group consisting of Periodic Table of the Elements Groups IA, IIA, IIIA, IVA, transition metals IIIB, IVB, VB, VIB, VIIB, VIII and IB, including lanthanides and actinides.

6. A method for crystallizing a molecular sieve encapsulating a macrocyclic organic molecule containing from about 8 to about 18 members in cyclic configuration with at least one bicyclic bridge having from about 3 to about 10 members, the molecule having members selected from a group consisting of carbon, nitrogen, oxygen, sulfur, selenium, phosphorus and arsenic, the members including at least two nitrogen atoms and at least one atom selected from a group consisting of oxygen, sulfur, selenium, phosphorus and arsenic and the members including sufficient bonds to adjacent members or to hydrogen to form stable molecules, the method comprising providing a reaction mixture capable of forming the molecular sieve and containing the macrocyclic organic molecule, maintaining the reaction mixture under conditions of temperature and pressure to effect crystallization of the molecular sieve until the molecular sieve is crystallized as containing encapsulated macrocyclic organic molecules.

7. The method of claim 6 wherein the molecular sieve selected from a group consisting of silicates, aluminosilicates, aluminophosphates, gallophosphates and silicoaluminophosphates.

8. The method of claim 6 wherein the molecular sieve is gallophosphate.

9. The method of claim 6 wherein the molecular sieve has the LTA framework topology.

10. The method of claim 6 wherein the macrocyclic organic molecule is complexed with at least one ion selected from a group consisting of Periodic Table of the Elements Groups, IA, IIA, IIIA, IVA, transition metals IIIB, IVB, VB, VIB, VIIB, VIII and IB, including lanthanides and actinides.

* * * * *